United States Patent
Horgan et al.

(10) Patent No.: US 10,179,865 B2
(45) Date of Patent: Jan. 15, 2019

(54) FREE RADICAL COATING COMPOSITION WITH IMPROVED SURFACE CURE PROPERTIES

(71) Applicant: Arkema France, Colombes (FR)

(72) Inventors: James P. Horgan, West Chester, PA (US); Michael A. Bailey, Aston, PA (US); Ronald R. Wlodyga, Phoenixville, PA (US)

(73) Assignee: Arkema France, Colombes (FR)

( * ) Notice: Subject to any disclaimer, the term of this patent is extended or adjusted under 35 U.S.C. 154(b) by 322 days.

(21) Appl. No.: 14/327,618

(22) Filed: Jul. 10, 2014

(65) Prior Publication Data

US 2015/0018479 A1    Jan. 15, 2015

Related U.S. Application Data

(60) Provisional application No. 61/844,900, filed on Jul. 11, 2013.

(51) Int. Cl.
| | |
|---|---|
| *C09D 133/14* | (2006.01) |
| *C09D 133/10* | (2006.01) |
| *C09D 4/00* | (2006.01) |
| *C08F 220/40* | (2006.01) |
| *C08F 222/10* | (2006.01) |
| *C08F 220/34* | (2006.01) |

(52) U.S. Cl.
CPC .............. *C09D 133/14* (2013.01); *C09D 4/00* (2013.01); *C09D 133/10* (2013.01); *C08F 220/40* (2013.01); *C08F 222/1006* (2013.01); *C08F 2220/343* (2013.01)

(58) Field of Classification Search
CPC ....... C09D 4/00; C09D 133/10; C09D 133/14
See application file for complete search history.

(56) References Cited

U.S. PATENT DOCUMENTS

| | | | |
|---|---|---|---|
| 3,458,458 A | 7/1969 | Ferguson et al. | |
| 3,700,624 A * | 10/1972 | Adachi et al. | C08L 67/06 524/141 |
| 4,040,923 A * | 8/1977 | Pacifici | C08F 2/50 430/924 |
| 4,049,634 A | 9/1977 | Ko et al. | |
| 4,232,078 A * | 11/1980 | Kamada | B29C 39/006 264/216 |
| 4,263,372 A | 4/1981 | Emmons et al. | |
| 4,520,184 A | 5/1985 | Van Eenam | |
| 5,164,127 A | 11/1992 | Boeekeler | |
| 5,387,661 A | 2/1995 | Frost | |
| 5,567,788 A | 10/1996 | Zezza | |
| 5,721,326 A | 2/1998 | Frost | |
| 6,395,822 B1 | 5/2002 | Edgington | |
| 6,559,260 B1 | 5/2003 | Fan et al. | |
| 6,835,759 B2 | 12/2004 | Bradford et al. | |

FOREIGN PATENT DOCUMENTS

| | | |
|---|---|---|
| GB | 1 474 011 | 5/1997 |
| JP | 3552324 B2 | 8/2004 |
| JP | 5034241 B2 | 9/2012 |

OTHER PUBLICATIONS

"Synthesis and Properties of Acrylate Funtionalized Alkyds". N. Thanamongkollit. M. Soucek. University of Akron Polymer Engineering Department, Progress in Organic Coatings, vol. 73 Issue 4, Apr. 2012 pp. 382-391.

"Tung-based Reactive Diluents for Alkyd Systems: Film Properties", K. Wutticharoenwong, J. Dzickowski, M. Soucek, University of Akron Polymer Engineering Department, Progress in Organic Coatings, vol. 73, Issue 4 Apr. 2012 pp. 283-290.

"Synthesis of Tung Oil-based Reactive Diluents", K. Wutticharoenwong, M. Souceck, University of Akron Polymer Engineering Department, Progress in Organic Coatings, vol. 295, 2010 pp. 1097-1106.

* cited by examiner

*Primary Examiner* — Wenwen Cai
(74) *Attorney, Agent, or Firm* — Christopher R. Lewis

(57) ABSTRACT

A crosslinking monomer for a peroxide cure composition is a dual functional monomer and has at least two allyl groups and at least one (meth)acrylate group. A composition comprises the crosslinking monomer and at least one (meth) acrylate monomer. A two-part peroxide composition comprises the crosslinking monomer, at least one (meth)acrylate monomer, and a peroxide initiator. The compositions, which may be wax-free or solvent-free or both, are useful as protective coatings or sealants for concrete and other substrates.

17 Claims, No Drawings

FREE RADICAL COATING COMPOSITION WITH IMPROVED SURFACE CURE PROPERTIES

CROSS REFERENCE TO RELATED APPLICATIONS

This application claims benefit to U.S. Provisional Application Ser. No. 61/844,900, filed Jul. 11, 2013.

FIELD OF THE INVENTION

The present invention relates to peroxide curable (meth) acrylate based-coating or sealant compositions comprising two parts, namely part (A) and part (B). Part A comprises at least one dual functional crosslinking monomer having at least 2 allyl groups and at least 1 (meth)acrylate group and Part B comprises an organic peroxide initiator. The compositions, which may be wax-free and/or solvent-free, are useful as protective coatings and/or sealants for concrete and other substrates.

BACKGROUND OF THE INVENTION

Peroxide cured (meth)acrylate resin coating compositions find a wide variety of uses in industry and are commonly used as coatings and sealants. The coating compositions are conventionally provided as two-component compositions which are mixed just prior to use. In typical formulations, Part A comprises the (meth)acrylate monomers and Part B comprises a peroxide initiator. Metal complex driers, such as cobalt naphthenate or cobalt octoate, are often added to the compositions as cure accelerators in these systems. Cobalt driers undergo oxidative reactions that reduce the decomposition temperature of the peroxide but by themselves are not enough to effectively cure the coating at the surface.

Peroxide cured coating compositions containing (meth) acrylate functional monomers and oligomers are known to the industry to not cure effectively in air due to oxygen inhibition.

Numerous attempts to develop additives to allow for effective curing in air have resulted in materials that were unstable in air, unstable when mixed with metal drier, had poor surface properties, or had viscosities impractical for use in a solvent-free coating system.

Paraffinic and other waxes are often added to these coatings compositions to provide an oxygen barrier formed through migration and crystallization of the waxes at the coating surface. For example, JP 2007197598 and JP 08231655 disclose peroxide cure coating systems comprising paraffin wax. The presence of the wax, however, detracts from the surface properties of the cured composition and decreases intercoat adhesion.

Crosslinking monomers such as dicyclopentenyl and dicyclopentenyloxy alkyl ester derivatives are known to the industry to be good reactive diluents and binder resins that also effectively promote surface cure in peroxide cured (meth)acrylate-based coatings in the presence of metal driers due to their sensitivity for oxidative reactions. However, these monomers are also known in the industry to be volatile and odorous which may present safety and handling concerns.

Other crosslinkable resins such as allyl ether derivatives including polyallyl glycidyl ether (PAGE) derivatives, allyl ester derivatives and allyl urethane derivatives are also known to effectively promote surface cure in peroxide cure (meth)acrylate-based coatings. Lower molecular weight resins are good reactive diluents but higher molecular weight resins like PAGE derivatives and polyallyl urethanes are too high in viscosity for some coating applications such as concrete sealers. These materials are also oxygen sensitive and undergo oxidative reactions in the presence of metal driers to generate hydroperoxides at the surface of the coating. Therefore, these allyl ether and PAGE derivatives present package stability issues if they are packaged with the metal drier in the resin component of a two-component peroxide cure (meth)acrylate-based coating composition. To avoid the stability issues, coating formulators typically have to package the surface cure promoting material as a third component or package the metal drier as a third component which is undesirable. Volatile non-aerobic sensitive materials such as oximes can be added to block metal drier oxidative reactions in the container and extend package stability. Subsequently, when the coating is applied to a substrate the oximes volatilize but they also slow down the rate of cure at the coating surface, which may lead to coating defects and increased tack-free times.

U.S. Pat. Nos. 4,520,184 and 5,567,788 disclose coating compositions containing allylic functional ethers and esters including PAGE derivatives comprising 20 allyl groups per chain, which contain easily abstracted allylic hydrogens that absorb oxygen and generate hydroperoxide radicals at the surface of the coatings. These materials are used as both reactive diluents and surface cure additives in two-component peroxide cure (meth)acrylate-based coatings. The allyl functional ethers and esters cause formulation issues due to their instability in the presence of free-radical cure accelerators such as metal driers in the resin component, which requires the formulator to either develop a complex stabilizer package or to separate the accelerator. When added to the peroxide initiator component of a two-component system, the addition of the functional ethers and esters result in a limited shelf life.

Oxygen inhibition observed in two-component (meth) acrylate-based peroxide free radical cured coatings containing allyl functional ethers and esters exhibit a difference in cure kinetics between allylic unsaturation and vinyl unsaturation in the base (meth)acrylate coating resins. The slower rate of cure of the allyl unsaturation at the surface of the coating can result in coating defects such as wrinkling, cratering, and orange peel. Additionally, although the allyl functional additives provide tack-free cure, the cured surface does not exhibit good scratch/mar resistance or solvent resistance.

Other methods for overcoming oxygen inhibition have been attempted. For example, U.S. Pat. No. 5,164,127 discloses curing the coating in an inert atmosphere or eliminating oxygen by injecting the coating into a closed mold and curing the in the mold.

U.S. Pat. No. 6,395,822 discloses the use of azonitrile-based free radical initiators in place of peroxide initiators, which are not sensitive to oxygen inhibition. The azonitrile initiators cannot be decomposed at ambient temperatures by accelerators and must be thermally cured.

U.S. Pat. No. 6,835,759 discloses the use of a dual UV photoinitiator/thermal peroxide cure system to eliminate cure rate differences between through cure and surface cure.

Other methods have been disclosed in U.S. Pat. Nos. 4,263,372; 5,387,661; 5,721,326; 6,559,260, "Synthesis and Properties of Acrylate Functionalized Alkyds", N. Thanamongkollit, M. Soucek, University of Akron Polymer Engineering Department, Progress in Organic Coatings, Vol. 73, Issue 4, April 2012, pp. 382-391; "Tung-based Reactive Diluents for Alkyd Systems: Film Properties," K. Wutticharoenwong, J, Dzickowski, M. Soucek, University of Akron Polymer Engineering Department, Progress in Organic Coatings, Vol. 73, issue, 4, April 2012, pp. 283-290, and "Synthesis of Twig Oil-based Reactive Diluents," K. Wutticharoenwong, M. Soucek, University of Akron Polymer Engineering Department, Progress in Organic Coatings, Vol. 295, 2010, pp. 1097-4106.

There is a need in the industry for additives that may avoid the problems caused by oxygen inhibition without some or all of the shortcomings identified above. The development of a low viscosity, low odor crosslinker that enables two-component, solvent-free, peroxide cured (meth) acrylate resin coating compositions to cure effectively in the presence of oxygen at both ambient and elevated temperatures and exhibit good surface properties is desirable.

SUMMARY OF THE INVENTION

The present invention relates to peroxide curable (meth) acrylate resin compositions containing crosslinking monomers having 2 or more free-radically polymerizable allylic moieties and at least one (meth)acrylate ester moiety.

The present invention is directed to low viscosity, low odor, dual allyl and (meth)acrylate functional crosslinkable monomer or oligomer compositions (i.e., greater than or equal to two allyl groups and greater than or equal to one (meth)acrylate group) that can be added to organic peroxide cure (meth)acrylate-based coating compositions to promote and/or enhance surface cure and surface properties in the presence of air. The inventors have discovered that the addition of diallyl(meth)acrylate monomer to the exemplary coating and/or sealant curable compositions eliminates the need to add paraffin wax to the composition to overcome the effect of oxygen inhibition. The addition of wax is considered to be undesirable because it reduces gloss. Thus, according to at least one embodiment, the two-component curable composition is essentially free, or free of waxes, such as, for example paraffin wax. In addition, the compositions of the present invention are less volatile, and less odoriferous than known compositions containing dicyclopentenyl alkyl ester derivatives.

Another aspect of the invention is that the monomer or oligomer compositions may be added to Part A of the two-component free-radical (peroxide) curable composition, which may be a coating or sealant composition, in the presence of cobalt metal drier, accelerator of peroxide decomposition, and the package will maintain stability during storage, thereby eliminating the requirement or need for a three component system.

Another aspect of the invention is that the compositions of the invention are free, or substantially free of solvents, including volatile organic content or "VOC" solvent content.

The present invention also relates to two-component peroxide cure compositions that are useful for concrete coating, sealing and repair, gel coat and laminating resins for fibrous composites, decorative and protective coatings for concrete, wood, plastic, and metal, conformal coatings and encapsulants. When used as a coating, the compositions of the invention reduce or eliminate surface coating defects, and/or improve coating surface hardness and scratch/mar resistance. The prior art compositions provide rapid below surface cure and slow surface curing which results in undesireable wrinkling, orange peel, and cratering. The compositions of the present invention, however, provide matched surface and below surface cure even without the presence of additional stabilizers like oximes.

DETAILED DESCRIPTION OF THE INVENTION

One aspect of the present disclosure relates to a crosslinking monomer for use in peroxide cure (meth)acrylate based compositions.

As used herein, "(meth)acrylate" is a collective term for 4-unsaturated acrylates that include esters of acrylic acid (e.g., alkyl acrylate resins) and esters of methacrylic acid (e.g., alkyl methacrylate resins).

In at least one embodiment, the crosslinking monomer is a dual function monomer comprising both allyl and (meth) acrylate functional groups. The dual functional crosslinking monomer according to at least one embodiment comprises at least two allyl functional groups, preferably from 2 to 10, more preferably from 2 to 6, even more preferably from 2 to 4 allyl groups and at least one (meth)acrylate functional group, preferably from 1 to 5 and more preferably from 1 to 3 (meth)acrylate groups.

As used herein, "allyl group" refers to a —$CH_2$—$CH$=$CH_2$ group or a —CHR—CR'=CR"R''', wherein R, R', R", and R''', which may be the same or different, are selected from a hydrogen atom or a substituted or unsubstituted alkyl group having from 1 to 4 carbon atoms. The allyl group comprises at least one allylic hydrogen.

The crosslinking monomer may comprise, for example, from 2 to 10 allyl groups, such as from 2 to 6 allyl groups, or from 2 to 4 allyl groups. In at least one embodiment, the crosslinking monomer comprises 2 allyl groups.

The crosslinking monomer may comprise one or more (meth)acrylate group, such as, for example, from 1 to 5 (meth)acrylate groups, or from 1 to 3 (meth)acrylate groups. In at least one embodiment, the crosslinking monomer contains a single (meth)acrylate group. According to a particular embodiment, the said crosslinking monomer comprises at least 2 allyl groups and at least 2 (meth)acrylate groups.

In at least one embodiment, the crosslinking monomer comprises 2 allyl functional groups and 1 (meth)acrylate group. One exemplary crosslinking monomer is diallyl trimethylolpropane methacrylate, as shown in Formula I (e.g., CAS #20241-99-0).

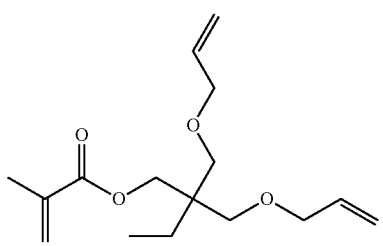

Formula I

The dual functionality crosslinking monomer may comprise at least two allyl groups and at least one (meth)acrylate group connected via a linking group chosen from branched and unbranched alkyl groups, which may optionally comprise at least one heteroatom substitution. In at least one embodiment, the linking group comprises 2 to 20 carbon atoms, such as, for example, from 2 to 10 carbon atoms, or from 3 to 7 carbon atoms. In another embodiment the crosslinking monomer used in the peroxide cure (meth)

acrylate based compositions of the invention may be a polyallyl glycidyl ether of a polyol selected from the group consisting of trimethylol propane, pentaerythritol (PET), ditrimethylol propane (diTMP), dipentaerythritol (diPET), the corresponding alkoxylated polyols, or mixtures thereof.

The composition comprising the said crosslinking monomer and said (meth)acrylate monomer may further comprise a urethane(meth)acrylate oligomer. It may further comprise a vinyl ester.

In at least one embodiment, the dual functionality crosslinking monomer comprising at least two allyl groups and at least one (meth)acrylate group has a molecular weight less than about 400 daltons, preferably less than about 350 daltons, more preferably less than about 300 daltons. The molecular weight can be calculated from the detailed chemical formula and atomic weights of the involved C, H, O or other atoms.

Another aspect of the present disclosure relates to a composition comprising a crosslinking monomer and at least one (meth)acrylate monomer.

In at least one embodiment, the composition comprises a dual functional crosslinking monomer, which comprises at least 2 allyl groups and at least 1 (meth)acrylate group, and at least one meth)acrylate monomer. In at least one embodiment, the crosslinking monomer comprises diallyl trimethylolpropane methacrylate. The (meth)acrylate monomer may be selected from those known in the art. One of ordinary skill in the art would recognize that the (meth)acrylate monomer can be chosen based on the desired properties of the cured composition.

(Meth)acrylate monomers may include, but are not limited to, polyethyleneglycol (200) dimethacrylate, trimethylolpropane trimethacrylate, ethoxylated bisphenol A dimethacrylate, tricyclodecanediol dimethacrylate, methoxy polyethyleneglycol monomethacrylates, ethoxytriglycol methacrylate, isobornyl methacrylate, isodecyl methacrylate, lauryl methacrylate, tridecyl methacrylate, stearyl methacrylate, tetrahydrafurfuryl methacrylate, ethoxylated nonylphenol methacrylate, ethyleneglycol dimethacrylate, diethyleneglycol dimethacrylate, triethyleneglycol dimethacrylate, tetraethyleneglycol dimethacrylate, polyethyleneglycol dimethacrylate, polypropyleneglycol dimethacrylate, 1,3 butyleneglycol dimethacrylate, neopentylglycol dimethacrylate, 1,6 hexanediol dimethacrylate, 1,12 dodecanediol dimethacrylate, ethoxylated bisphenol A dimethacrylate (all available from Sartomer USA, LLC) and mixtures thereof.

In at least one embodiment, the (meth)acrylate monomer has a (meth)acrylate functionality greater than 2.

The composition may comprise other monomers or oligomers in addition to the at least one (meth)acrylate monomer. For example, the composition may comprise a vinyl ester such as bisphenol A vinyl ester, glycidyl ether acrylate oligomers made from phenyl glycidyl ether, o-cresyl ether, $C_{12}$-$C_{14}$ glycidyl ether, diglycidyl epoxy acrylate oligomers made from bisphenol A diglycidyl ether, bisphenol F diglycidyl ether, 1,4 butanediol diglycidyl ether, trimethyloplpropane triglycidyl ether, epoxy acrylate oligomers made from epoxidized fatty acids, aromatic urethane acrylate oligomers, aliphatic urethane acrylate oligomers, polyester acrylate oligomers, acrylic acrylate oligomers, (all available from Sartomer USA, LLC), and mixtures thereof. Other monomers include, for example, allyl urethane oligomers, such as those disclosed in U.S. Pat. No. 6,559,260, which is incorporated herein by reference in its entirety.

In at least one embodiment, the composition does not comprise solvent, which means it is free of, or substantially free of, solvents. In these embodiments the composition may consist of, or consist essentially of, a crosslinking monomer and at least one (meth)acrylate monomer. As used herein, the term "consisting essentially of" excludes solvents, which do not become part of the cured composition. Preferably, in at least one embodiment, the composition does not comprise added solvent and there is no solvent in any of the components.

In at least one embodiment, the composition of invention does not comprise, and is free of, or substantially free of styrene. Styrene typically is a reactive ingredient.

According to at least one embodiment, Part A may further comprise a metal drier as an accelerator for peroxide initiation and/or a free radical stabilizer such as 1,4 pentanedione. Exemplary metal driers are metal salts of organic acids which include cobalt naphthenate and cobalt octoate, vanadium naphthenate and vanadium octoate, manganese naphthenate and manganese octoate, preferably cobalt naphtenate or cobalt octoate.

In at least one embodiment the (meth)acrylate monomer of said composition, has a (meth)acrylate functionality greater than 2. The composition of the invention may also further comprise a tetra-allyl urethane oligomer.

In accordance with at least one embodiment, the composition may further comprise pigment, such as, for example, titanium dioxide. The composition may further comprise other additives, including, for example, dispersion aids, fillers, leveling agents, and/or adhesion promoters.

A further aspect of the present disclosure relates to a two-component peroxide cure or peroxide-curable composition. Part A of the two-component composition may comprise at least one composition as described above comprising a crosslinking monomer and at least one (meth)acrylate monomer, and Part B may comprise a peroxide initiator.

in at least one embodiment, Part A comprises a dual functional crosslinking monomer according to various embodiments of the present disclosure. According to at least one embodiment, the crosslinking monomer comprises at least 2 allyl groups and at least 1 (meth)acrylate group, such as, for example, diallyl trimethylolpropane methacrylate.

Part A may comprise at least one (meth)acrylate monomer and optionally, at least one additional monomer. For example, Part A may comprise a (meth)acrylate monomer and a vinyl ester monomer.

The invention is directed to two component free-radical curable coating compositions. In such compositions, "free-radical" means that the composition is cured by a free radical mechanism initiated by organic peroxide. In at least one embodiment, Part B of the two-component composition comprises a peroxide initiator. Non-limiting examples of peroxide initiators include LUPEROX® CU80 cumene hydroperoxides (available from Arkema, Inc.), methylethyl ketone peroxide, tertiary-butyl peroxybenzoate, 00-(t-amyl) 0-(2-ethylhexyl)monoperoxycarbonate, 00-(t-butyl) 0-(2-ethylhexyl)monoperoxycarbonate, all available from Arkema Inc. and the like.

In accordance with at least one embodiment, Part A or Part B may comprise additional components, such as, for example, other monomers, such as allyl urethane monomers or oligomers. In particular part A or/and B may comprise a tetra-allyl urethane oligomer.

In at least one embodiment, the two-component composition is free, or substantially free of solvents. According to at least one embodiment, Part A and Part B of the two-component composition do not comprise a solvent or VOC. As used herein, excluded solvents also include, for example, solvents having volatile organic compounds (VOCs). Therefore, in at least one embodiment, the composition of the invention contains substantially zero, or in some instances 0%, VOC.

Part A and Part B of the two-component composition may be contained separate from one another until the composition is ready to be used.

The two-component composition, when mixed, may have a viscosity at 25° C. less than about 35 mPa·s (cP) using a Brookfield DV-III RVT Viscometer, such as, for example, less than about 30 mPa·s (cP), less than about 25 mPa·s (cP), or less than about 20 mPa·s (cP). Viscosity is measured according to ASTM D1243.

In at least one embodiment, the two-component composition has a gel time less than about 1 hour at 25° C. as measured based on a 25 g sample using a Sunshine Gel Meter, such as, for example, less than about 45 minutes, less than about 30 minutes, less than about 25 minutes, less than about 20 minutes, or less than about 15 minutes. In at least one embodiment, the two-component composition has a gel time ranging from about 10 to 30 minutes, such as, from about 15 to 25 minutes. Gel time is measured according to ASTM D7029-09.

In at least one embodiment, the two-component composition cures tack-free in less than about 24 hours when measured using a gloved fingertip, preferably less than 18, more preferably less than about 16, even more preferably less than 12 hours, and even more preferably less than 10 hours.

In at least one embodiment, a method of forming a coating comprises mixing Part A and Part B of the two-component composition and curing the composition.

The present invention includes the crosslinking monomers described above and the use of such compositions for concrete coatings, including decorative or protective coatings, concrete sealing, concrete repair, gel coats and laminating resins in fibrous composites, and/or for decorative or protective coatings for wood, plastic, metal or for conformal coatings and encapsulants.

The compositions according to the present disclosure may be used in coatings or sealants or as coatings or sealants, for example, as sealers for concrete, for concrete repair, and metals. The term "coating" as used herein includes paints, varnishes, inks, and/or gel coats. For example compositions according to the present disclosure may also be used as gel coats for fibrous composites.

The present invention also relates to a coating curable composition and to a sealant curable composition comprising the compositions described herein.

The invention also includes the crosslinked final product resulting from the cure of said at least one composition of the invention. In particular said products are selected from coatings or sealants.

The embodiments and examples disclosed herein are not intended to limit the scope of the invention in any way.

EXAMPLES

The following examples demonstrate two-component peroxide cure coating compositions according to various embodiments of the disclosure. Viscosities were measured using a Brookfield DV-III RVT Viscometer according to ASTM D1243. Gel times were measured on 25 g samples using a Sunshine Gel Meter according to ASTM D7029. Specified amounts of formulation were poured into aluminum weighing pans to measure Shore D Hardness following ASTM D2249 and tack-free surface cure by gloved fingertip. Coating test panels were prepared using a wire-wound drawdown bar designed to put down the specified coating thickness. Tack-free cure time for these samples was measured using a Byk-Gardner Dry Time Recorder according to ASTM D5895-13. Pencil Hardness for these coatings was measured following ASTM D3363. 60 degree Gloss was measured using a Byk-Gardner Glossmeter following ASTM D523. Solvent resistance was measured by the MEK Double Rub method following ASTM D4752, Example 1 and Comparative Example 2

Two-component peroxide cure coating compositions based on methacrylate monomers were prepared according to Table 1. The components of Part A were mixed together in the order they are listed using low shear until homogeneous. The diallyl TMP methacrylate surface cure promoter of the present invention was added at 17% by weight to Part A of the composition in Example 1. In Comparative Example 2, dicyclopentenyl methacrylate as a surface cure promoter. Part B was prepared by first warming the tetraallyl urethane oligomer to 40° C. in a forced air oven and then adding it slowly to the cumene hydroperoxide initiator and mixing with low shear until homogeneous. Part A and Part B were then mixed with low Shear until homogeneous.

TABLE 1

|  | Example 1 | Comparative Example 2 |
| --- | --- | --- |
| Part A |  |  |
| SR210A Polyethyleneglycol(200) Dimethacrylate | 40 | 40 |
| SR350 Trimethylolpropane Trimethacrylate | 25 | 25 |
| SR535 Dicyclopentenyl Methacrylate | — | 17 |
| Diallyl Trimethylolpropane Methacrylate | 17 | — |
| 6% Cobalt Octoate | 1.0 | 1.0 |
| Part B |  |  |
| LUPEROX ® CU80 Cumene Hydroperoxide | 2.0 | 2.0 |
| CN9101 Tetraallyl Urethane Oligomer | 15.0 | 15.0 |
| Properties |  |  |
| Viscosity at 25° C. (cps) | 17.0 | 17.5 |
| Gel Time, 50 g at 25° C. (mins) | 18.0 | 21.0 |
| Tack-Free Cure Time, 20 mil at 25° C. (hrs) | 10.0 | 18.0 |

The composition of Example 1 containing the diallyl methacrylate crosslinker exhibits acceptable application viscosity (<25 cps), acceptable gel time (15-25 minutes) and high hardness.

Example 3 and Comparative Example 4

Two-component thermal peroxide cure coating compositions based on vinyl ester resin that are useful as gel coats for fibrous composites were prepared according to Table 2. Part A was prepared by first warming PRO10364 vinyl ester resin to 50° C. in a forced air oven. The vinyl ester resin was then added to SR349 3 mole ethylene oxide bisphenol A dimethacrylate and then SR206 ethyleneglycol dimethacrylate (Comparative Example 4) and the diallyl methacrylate surface cure promoter (Example 3) of the present invention, respectively, were added. 1.0 pbw 6% cobalt 2-ethylhexanoate and 0.05 pbw dimethyl-p-toluidine (DMPT) were then added to each Part A and mixed with low shear until homogeneous. Part B was prepared by mixing cumene hydroperoxide and t-amyl ethylhexyl peroxycarbonate by stirring with a glass rod by hand until homogeneous.

The composition of Example 3 containing the diallyl methacrylate crosslinking exhibits good application viscosity and acceptable gel time (15-25 minutes). However, it also exhibited improved tack-free cure time over the dimethacrylate diluted formulation.

TABLE 2

|  | Example 3 | Comparative Example 4 |
|---|---|---|
| Part A |  |  |
| Bisphenol A Vinyl Ester Resin | 40.0 | 40.0 |
| SR349 3EO Bisphenol A Dimethacrylate | 28.0 | 28.0 |
| SR206 Ethyleneglycol Dimethacrylate | — | 32.0 |
| Diallyl Trimethylolpropane Methacrylate | 32.0 | — |
| 6% Cobalt Octoate | 1.0 | 1.0 |
| 2, 4-Pentanedione | 0.4 | 0.4 |
| Part B |  |  |
| LUPEROX ® CU80 Cumene Hydroperoxide | 3.2 | 3.2 |
| LUPEROX ® TAEC | 0.8 | 0.8 |
| Properties |  |  |
| Viscosity at 25° C. (cps) | 350 | 270 |
| Gel Time, 50 g at 25° C. (mins) | 20 | 15 |
| Tack-Free Cure Time, 20 mil at 25° C. (hrs) | 15 | >24 |

Example 5

A two-component peroxide cure coating composition based on a urethane methacrylate oligomer which is useful as a protective white topcoat for concrete or metal was prepared according to Table 3. Part A was prepared by first dispersing $TiO_2$ pigment in the urethane dimethacrylate oligomer using AntiTerra. U as a pigment dispersant with a high speed dispermat mixer. The formulation was then letdown with SR834 dimethacrylate monomer and the diallyl methacrylate monomer, 0.3 pbw of 6% cobalt 2-ethylhexanoate and 0.1 pbw DMPT were then added and mixed with low shear until homogeneous. Part B was prepared by first warming the tetraallyl urethane to 40° C. in a forced air oven and then adding it slowly to the cumene hydroperoxide and the tert-amyl ethylhexyl peroxycarbonate initiators and mixed with low shear until homogeneous. Part A and Part B were then mixed together with low shear until homogeneous.

The composition of Example 5 containing diallyl methacrylate monomer crosslinker exhibits good application viscosity, acceptable gel time (25-30 minutes) and cures tack-free in 24 hours.

TABLE 3

|  | Example 5 |
|---|---|
| Part A |  |
| Grind Portion |  |
| CN1963 Aliphatic Urethane Dimethacrylate | 53.00 |
| Ti-Pure R960 Titanium Dioxide | 13.00 |
| Anti-Terra U Pigment Dispersion Aid | 1.00 |
| Letdown Portion |  |
| SR834 Tricyclodecanediol Dimethacrylate | 9.00 |
| Diallyl Trimethylolpropane Methacrylate | 15.00 |
| 6% Cobalt Octoate | 0.30 |
| Dimethyl-p-toluidine | 0.10 |

TABLE 3-continued

|  | Example 5 |
|---|---|
| Part B |  |
| LUPEROX ® CU80 Cumene Hydroperoxide | 1.25 |
| LUPEROX ® TAEC | 0.50 |
| CN9101 Tetraallyl Urethane Oligomer | 10.00 |
| Properties |  |
| Viscosity at 25° C. (cps) | 3930 |
| Gel Time, 50 g at 25° C. (mins) | 28 |
| Tack-Free Cure Time, 20 mil at 25° C. (hrs) | 24 |
| 60° Gloss | 90.0 |
| Pencil Hardness | 3H |

The invention claimed is:

1. A curable coating composition comprising a crosslinking monomer having a molecular weight of less than about 400 daltons, at least one (meth)acrylate monomer different from the crosslinking monomer, wherein said crosslinking monomer is a dual functional monomer comprising at least 2 allyl groups and at least 1 (meth)acrylate group, and a urethane (meth)acrylate oligomer, wherein said crosslinking monomer is prepared from a polyallyl glycidyl ether of a polyol selected from the group consisting of trimethylol propane, pentaerythritol(PET), ditrimethylol propane (diTMP), dipentaerythritol(diPET), the corresponding alkoxylated polyols, and mixtures thereof.

2. The composition of claim 1, wherein said crosslinking monomer comprises at least 2 allyl groups and at least 2 (meth)acrylate groups.

3. The composition of claim 1 further comprising urethane (meth)acrylate oligomer.

4. The composition of claim 1 further comprising a vinyl ester.

5. The composition of claim 1, wherein the composition does not comprise a solvent.

6. The composition of claim 1, further comprising a metal complex drier.

7. The composition of claim 6, wherein said metal complex drier is selected from the group consisting of cobalt naphthenate, cobalt octoate, vanadium naphthenate, vanadium octoate, manganese naphthenate and manganese octoate.

8. The composition of claim 1, wherein said at least one (meth)acrylate monomer has a (meth)acrylate functionality greater than 2.

9. The composition of claim 1, further comprising a tetra-allyl urethane oligomer.

10. The composition of claim 1, wherein the composition does not comprise styrene.

11. The composition of claim 1 further comprising an additional monomer or oligomer.

12. The composition of claim 11, wherein the additional monomer or oligomer is selected from the group consisting of a vinyl ester, a glycidyl ether acrylate oligomer, a diglycidyl epoxy acrylate oligomer, an epoxy acrylate oligomer, an aromatic urethane acrylate oligomer, an aliphatic urethane acrylate oligomer, a polyester acrylate oligomer, an acrylic acrylate oligomer, an allyl urethane oligomer, and mixtures thereof.

13. A curable sealant comprising the composition of claim 1.

14. A curable coating composition comprising a crosslinking monomer having a molecular weight of less than about 400 daltons, and at least one (meth)acrylate monomer different from the crosslinking monomer, wherein said crosslinking monomer is a dual functional monomer comprising at least 2 allyl groups and at least 1 (meth)acrylate group, and a urethane (meth)acrylate oligomer, wherein the crosslinking monomer is diallyl trimethylolpropane ether (meth)acrylate.

15. A two-component free-radical curable composition comprising Part A and Part B, wherein Part A comprises a curable coating composition comprising a crosslinking monomer having a molecular weight of less than about 400 daltons, and at least one (meth)acrylate monomer different from the crosslinking monomer, wherein said crosslinking monomer is a dual functional monomer comprising at least 2 allyl groups and at least 1 (meth)acrylate group, and a urethane (meth)acrylate oligomer and Part B comprises an organic peroxide.

16. The two-component free-radical curable composition of claim 15, wherein Part A or/and Part B further comprises a tetra-allyl urethane oligomer.

17. The two-component free-radical curable composition of claim 15, wherein Part A further comprises a pigment.

* * * * *